United States Patent
Jain et al.

(10) Patent No.: US 7,765,313 B2
(45) Date of Patent: Jul. 27, 2010

(54) HIERARCHICAL PROTOCOL CLASSIFICATION ENGINE

(75) Inventors: Hemant Kumar Jain, San Jose, CA (US); Namit Sikka, San Jose, CA (US); King Rhoton, San Francisco, CA (US)

(73) Assignee: Alcatel Lucent, Paris (FR)

( * ) Notice: Subject to any disclaimer, the term of this patent is extended or adjusted under 35 U.S.C. 154(b) by 993 days.

(21) Appl. No.: 10/177,043

(22) Filed: Jun. 21, 2002

(65) Prior Publication Data
US 2003/0131116 A1 Jul. 10, 2003

Related U.S. Application Data (60) Provisional application No. 60/328,297, filed on Oct. 9, 2001.

(51) Int. Cl.
G06F 15/16 (2006.01)
(52) U.S. Cl. ............... 709/230; 709/228; 370/338; 718/104
(58) Field of Classification Search .......... 709/230, 709/228; 370/388; 718/104
See application file for complete search history.

(56) References Cited

U.S. PATENT DOCUMENTS

| | | | | |
|---|---|---|---|---|
| 6,157,955 A * | 12/2000 | Narad et al. | ............ | 709/228 |
| 6,185,568 B1 * | 2/2001 | Douceur et al. | ............ | 707/10 |
| 6,412,000 B1 * | 6/2002 | Riddle et al. | ............ | 709/224 |
| 6,452,915 B1 * | 9/2002 | Jorgensen | ............ | 370/338 |
| 6,567,408 B1 * | 5/2003 | Li et al. | ............ | 370/395.31 |
| 6,651,099 B1 * | 11/2003 | Dietz et al. | ............ | 709/224 |
| 6,665,725 B1 * | 12/2003 | Dietz et al. | ............ | 709/230 |
| 6,765,904 B1 * | 7/2004 | Anandakumar et al. | ..... | 370/389 |
| 6,940,861 B2 * | 9/2005 | Liu et al. | ............ | 370/395.21 |
| 7,184,441 B1 * | 2/2007 | Kadambi et al. | ............ | 370/400 |
| 2003/0005144 A1 * | 1/2003 | Engel et al. | ............ | 709/235 |

FOREIGN PATENT DOCUMENTS

| | | |
|---|---|---|
| EP | 0 862 302 A2 | 9/1998 |
| WO | WO 00/78004 A3 | 12/2000 |
| WO | WO 01/33774 A1 | 5/2001 |

OTHER PUBLICATIONS

Postel, Jon; "Internet Protocol, DARPA Internet Program Protocol Specification;" Prepared for Defense Advanced Research Projects Agency; Information Sciences Institute, University of Southern California; Marina del Rey, California; ftp://ftp.isi.edu/in-notes/rfc791.txt; 45 Pages; Sep. 1981.

(Continued)

Primary Examiner—George C Neurauter, Jr.
Assistant Examiner—Kyung H Shin
(74) Attorney, Agent, or Firm—RG & Associates LLC (57) ABSTRACT

A classification engine is capable of receiving a plurality of protocol data units (PDUs) and performing a tree-based classification on the PDUs. The classification engine includes: input means for receiving the PDUs; parsing means capable of parsing the PDUs to generate an abstracted protocol structure for at least one of the PDUs; classifier capable of performing the tree-based classification, said classifier being capable of enforcing policy using the abstracted protocol structure; and output means for transmitting the PDUs.

8 Claims, 3 Drawing Sheets

OTHER PUBLICATIONS

Postel, Jon; "Transmission Control Protocol, DARPA Internet Program Protocol Specification;" Prepared for Defense Advanced Research Projects Agency; Information Sciences Institute, University of Southern California; Marina del Rey, California; ftp://ftp.isi.edu/in-notes/rfc793.txt; 81 Pages; Sep. 1981.

Postel, J., et al., "File Transfer Protocol (FTP);" Network Working Group; ftp://ftp.isi.edu/ini-notes/rfc959.txt; 61 Pages; Oct. 1985.

Postel, J.; "User Datagram Protocol;" ftp://ftp.isi.edu/in-notes/rfc768.txt; 3 Pages; Aug. 28, 1980.

Egevang, K, et al.; "The IP Network Address Translator (NAT);" Network Working Group; ftp://ftp.isi.edu/in-notes/rfc1631.txt; 9 Pages; May 1994.

Shenker, S. et al.; "Specification of Guaranteed Quality of Service;" Network Working Group; ftp://ftp.isi.edu/in-notes/rfc2212.txt; 18 Pages; Sep. 1997.

Wahl, M. et al.; "Lightweight Directory Access Protocol (v3);" Network Working Group; ftp://ftp.isi.edu/in-notes/rfc2251.txt; 44 Pages; Dec. 1997.

"Series X: Data Networks and Open System Communications, OSI Networking and System Aspects—Abstract Syntax Notation One (ASN.1);" International Telecommunication Union, ITU-T Recommendation X.680; 9 Pages; Dec. 12, 1997.

"Information Technology—Abstract Syntax Notation One (ASN:1): Specification of Basic Notation;" International Standard; ITU-T Recommendation; ISO/IEC 8824-1:1998(E); 100 Pages; 1998.

Kotelba, Marek, et al.; "Gateway for H.323 Media Transport Over ATM;" The ATM Forum, Technical Committee; AF-SAA-0124.000; 36 Pages; Jul. 1999.

* cited by examiner

HIERARCHICAL PROTOCOL CLASSIFICATION ENGINE

CROSS REFERENCE TO RELATED APPLICATION(S)

This application claims priority of U.S. Provisional Patent Application No. 60/328,297 entitled "Hierarchical Protocol Classification Engine with Integrated Support for Network Address Translation, Firewall Decision and Quality of Service (QoS) Tagging," filed on Oct. 9, 2001, the contents of which are hereby incorporated by reference.

FIELD OF THE INVENTION

The present invention is related to classification of protocol data units (PDUs) in a computer network, and in particular to a method and apparatus for performing a hierarchical protocol classification.

BACKGROUND

As the Internet becomes more ubiquitous, the network becomes increasingly vulnerable to overload and misuse. The need to control access to Internet services and to control the Wide Area Network (WAN) bandwidth leads to need for firewalls and quality of service (QoS) based networks. In addition, lack of ample public IP (Internet Protocol) addresses and a need to secure private networks from outside networks lead to Network Address Translation (NAT).

A number of new Internet based protocols has been developed to support a wide range of applications and services. Each of these new protocols brings with it usability issues and security concerns, especially for enterprises that want to gain the obvious advantages by being part of the Internet but at the same time protect their internal computing and data resources. Hence, it is increasingly desirable to inspect and authorize all data traffic flowing into and out of enterprise networks. This typically requires the enterprise or carrier firewall to recognize the various protocols in the Internet traffic flowing through it and apply the appropriate security policy on the traffic. However, recognizing the various protocols presents serious challenges.

Many IP based protocols can be identified just by looking at the transport layer (layer 4) information (e.g., TCP (Transmission Control Protocol) or UDP (User Datagram Protocol) port number). However, many newer protocols do not just use one port. Instead, they dynamically allocate ports and use them. Examples of such protocols are File Transfer Protocol (FTP) and H.323 series of ITU (International Telecommunications Union) protocols.

Many of the Internet Protocols also have an associated set of subsidiary channels in addition to the main channel, through which communication takes place between two network nodes. Such usage can be found, for example, in H.323 and FTP. Such channels need to be statefully identified to operate the firewall safely and they should be closed when the main channel closes.

Additionally, to conserve IP addresses and to protect private addresses of enterprises, Network Address Translation (NAT) can be used. Use of NAT in a device may add more requirements, because some of the protocols send IP address (layer 3) and port (layer 4) information within the application data (layer 7). Thus the layer 7 information should be transformed appropriately on two (public and private) sides of the device.

Further, usage of NAT may cause many applications to stop working across platform, unless the device which does the NAT operation also does the address translation in the application layer in addition to the network layer. For example, FTP provides such changes in the application layer information, where the dynamic data channel is negotiated in the application layer.

Conventional protocol classification systems typically suffer from lack of standards on one or more of: 1) representation of abstract information, such representation typically being left as programmer's choice; 2) representation of the state information; 3) storage of protocol classification tree which can be dynamically modified; 4) storage of policies and their linkage to the protocol classification tree; 5) a practical application programmer interface to manage the firewall, NAT and QoS; and 6) a way to handle complex protocols such as H.323 with the above features.

Therefore, it is desirable to provide a method and apparatus for classifying PDUs based on hierarchical protocol classification, while providing support for NAT, firewall decisions and QoS tagging.

SUMMARY

In an exemplary embodiment according to the present invention, a classification engine is capable of receiving a plurality of protocol data units (PDUs) and performing a tree-based classification on the PDUs, the classification engine includes: input means for receiving the PDUs; parsing means capable of parsing the PDUs to generate an abstracted protocol structure for at least one of the PDUs; classifier capable of performing the tree-based classification, said classifier being capable of enforcing policy using the abstracted protocol structure; and output means for transmitting the PDUs.

In another exemplary embodiment according to the present invention, a method of processing a PDU in a classification engine is provided. The method includes: receiving the PDU; parsing the PDU to generate an abstracted protocol structure for the PDU; performing a tree-based classification on the PDU; enforcing policy using the abstracted protocol structure; and transmitting the PDU.

In yet another exemplary embodiment according to the present invention, a method for performing protocol classification for a PDU is provided. The method includes receiving the PDU in a classification engine; applying protocol syntax on the PDU to generate an abstracted protocol structure that corresponds to the PDU; tagging the PDU with at least one tag; and regenerating the PDU using the abstracted protocol structure and said at least one tag.

In still another exemplary embodiment according to the present invention, a classification engine capable of receiving and classifying a plurality of protocol data units (PDUs) is provided. The classification engine includes: means for performing network address translation (NAT) on at least one of the PDUs; means for performing firewall decision on at least one of the PDUs; and tagging means for tagging at least one of the PDUs with at least one tag for Quality of Service (QoS) determination.

DETAILED DESCRIPTION

In an exemplary embodiment according to the present invention, a classification engine is provided, which may be used to: 1) classify incoming protocol data units (PDUs) into a service and/or a service group for the purposes of providing firewall and/or quality of service (QoS) policy; 2) perform Network Address Translation (NAT) in application layer; and 3) identify dynamically negotiated ports and open the firewall during the life of the connection and statefully close the ports at the end of the connection.

The PDUs may include one or more of IP packets, ATM (Asynchronous Transfer Mode) cells, Ethernet frames, and/or any other data units that are used in network communications. Further, the term packet may be used interchangeably with PDU herein to refer to a protocol data unit.

For example, the dynamically negotiated ports may be identified through stateful inspection, during which information about connection/stream for the PDUs are typically remembered. A number of PDUs may belong to the same connection/stream, and these PDUs are statefully inspected, for example, by the firewall.

In the exemplary embodiment, a method and apparatus are provided using which a switch, which may be an integrated device (e.g., a device that supports stateful inspection firewall, NAT and QoS using the exemplary classification engine of the present invention), can perform one or more of the following: 1) provide a graphical user interface to represent the list of recognized protocols as a hierarchical tree and to extend this list by sub-classifying a protocol; 2) store a hierarchical protocol tree in persistent storage in form of an LDAP (Lightweight Directory Access Protocol) tree; 3) load the hierarchical tree from LDAP into a memory resident tree; 4) abstract and transcribe relevant protocol information from the point of view of firewall, QoS and NAT; 5) parse the relevant protocol information in a PDU; 6) keep state between multiple application PDUs to enforce protocol restrictions; 7) statefully match and tag the IP packets for the purpose of QoS based on the memory resident tree for classification; 8) enforce firewall security policies on network traffic based on the results of classification on matched PDUs; and 9) output the transformed protocol information into a data stream (e.g., TCP data stream).

The exemplary embodiment provides for ways to represent abstract information from the perspective of an integrated device. Further, the exemplary embodiment provides for a complete process of PDU processing from end-to-end. In the exemplary embodiment, a hierarchical protocol classification is used, and the protocol hierarchy can be abstracted in terms of an LDAP schema. The representation of the schema typically depends on the sub-classes classes of the protocol that should be tagged.

The abstract information, for example, is the information extracted from the packet, which is necessary for stateful inspection firewall to operate with NAT. In the exemplary embodiment, the abstract information may be represented using abstract syntax notation. Examples of using the abstract syntax notation is given below in reference to RealAudio® and TCP.

Many protocols have a lot of information that is irrelevant from the point of supporting firewall, NAT and QoS functionality, while that information may be useful from the protocol's point of view. Thus, it may be desirable to abstract only the information that may be useful from the point of view of firewall, NAT and/or QoS.

Different PDUs typically have different structures and semantics. An exemplary embodiment may provide for various different ways to parse the information. Further, another exemplary embodiment may provide for ways in which the abstracted information can be used to tag, statefully close and/or open additional channels. Yet another exemplary embodiment may provide for NAT transformation and a way to rebuild the PDU for output.

Figure 1:
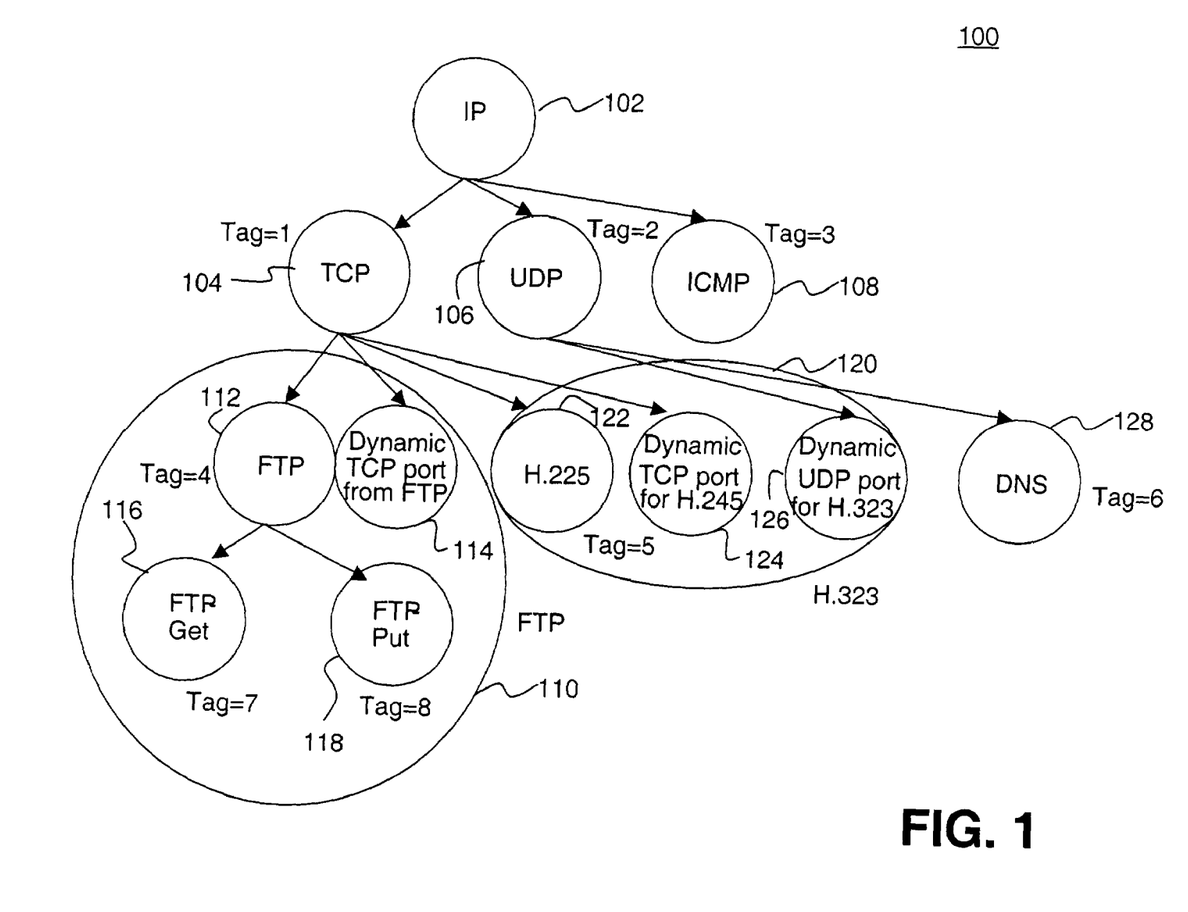
FIG. 1 illustrates a protocol classification tree, which may be used during implementation of an exemplary embodiment according to the present invention.

FIG. 1 illustrates a protocol classification tree 100, which may be used during implementation of an exemplary embodiment according to the present invention. In FIG. 1, IP 102 is shown as the base protocol. Those skilled in the art would appreciate, however, that the present invention is not restricted to IP as the base protocol. In other embodiments, for example, the base protocol may be 802.3, AppleTalk, ATM or any other suitable protocol known to those skilled in the art.

The protocol classification tree 100 is based on the principle of protocol layering, which has been adopted by Internet protocols. For example, an IP PDU includes multiple protocol headers, each containing information relevant to its position in the layered protocol stack. In the protocol classification tree 100, a node represents a protocol at a particular layer.

Protocols in the non-leaf nodes can be extended because they are capable of encapsulating higher level protocol headers in their payload. Children of a non-leaf node represent the next level protocols in the TCP/IP protocol stack. Leaf nodes are typically incapable of being extended. Each node in the protocol tree has a tag or a number associated with it. In other embodiments, the nodes may be assigned different tags and/or numbers.

The classification process typically starts from a particular point in the protocol tree and walks down from that point on by matching a particular child node with the information present in the PDU for that node's protocol. This process generally continues until no further classification is possible. The result of classification of an IP PDU in the exemplary embodiment is then a list of tags, which represent the various protocol headers present in the IP PDU.

For example, TCP 104 is a sub-protocol of IP 102 that can be identified if the value of the protocol field in the IP PDU header is 6. When a traffic of the type TCP arrives, the PDUs should be tagged with a value of 1 as illustrated in FIG. 1. Further, UDP 106 is another sub-protocol of IP protocol that can be identified if the protocol field in the IP packet is 17 and similarly, ICMP (Internet Control Message Protocol) has a value of 1 in the protocol field. When traffic of the type UDP arrives, the PDUs should be tagged with a value of 2. Similarly, when traffic of the type ICMP arrives, the PDUs should be tagged with a value of 3. Of course, different tag values may be assigned in different embodiments to these and other protocols/sub-protocols.

Within TCP, two protocols have been selected for illustrative purposes on FIG. 1. FTP 112 runs on a destination port 21 while H.225 122 runs on a destination port 1720. These destination port numbers are known to those skilled in the art. When a traffic of the type FTP arrives, the PDUs should be tagged with a value of 4, and when the traffic is of the type H.225, the PDUs should be tagged with a value of 5.

Within UDP, just one protocol has been selected for illustrative purposes on FIG. 1. DNS 128 runs on a destination port 53, which is known to those skilled in the art. When traffic of the type DNS arrives, the PDUs should be tagged with a value of 6 according to FIG. 1.

FTP protocol data units can be sub-classified based on many parameters. In FIG. 1, for illustrative purposes, two PDUs have been sub-classified, with the rest being treated as generic FTP. These two PDUs are FTP-Get 116 and FTP-Put 118. If the user uses 'get' or 'put' command in an FTP client, the client sends get or put command, respectively, to the server. In this case, the classifier identifies these two commands over the rest of the commands. When FTP-Get PDUs arrive, they should be tagged with a value of 7, and FTP-Put PDUs should be tagged with a value of 8.

As can be seen from FIG. 1, FTP-Put and FTP-Get PDUs cannot be further classified in the exemplary embodiment. Similarly, in the exemplary embodiment, ICMP, H.225 and DNS PDUs are not sub-classified. In practice and in other embodiments, one or more of these PDUs may be sub-classified, depending on the design preferences/requirements of a system designer.

Some of the operations in FTP protocol (such as get, ls, etc.) may require an additional channel to be set up. An example of the additional channel is a dynamically negotiated port 114 in the conversation between the client and the server. For the purposes of firewall, this port should be dynamically opened.

Similarly, as part of H.225 protocol, a dynamic TCP channel 124 is negotiated for H.245 protocol. Within H.245 protocol, a set of dynamic UDP channels 126 may be negotiated. This set of dynamic UDP channels 126 may contain audio and video data. Thus, a mechanism to divert anticipated H.245 traffic to a classification process running for H.245 may be used.

It should be noted that H.245 should further classify the traffic, so as to statefully isolate UDP traffic. On a formal closing of H.245 channels, the dynamically anticipated UDP ports should be closed. Similarly, H.245 port should be closed when a close-channel PDU is seen for H.245.

The associated channels may be tagged as parent's tags in the exemplary embodiment. For example, FTP data channel should be tagged with a value of 4 while H.245 and associated UDP channels for voice and video should be tagged with a value of 5. The tagging of associated data channels may, for example, be left to a system designer.

Given the protocol classification tree 100 of FIG. 1, it can be seen that the implemented system may:

1) Classify IP based on protocol field;

2) Classify TCP traffic based on destination port field. Identify FTP when the destination port is 21 and H.225 when the destination port is 1720;

3) Classify UDP traffic based on the destination port field. If the traffic is for destination port 53, classify it as DNS;

4) Not classify ICMP field further;

5) Sub-classify FTP PDUs so as to isolate get and put commands from the rest;

6) Identify dynamically negotiated FTP data channel, and statefully open and close it. Treat this traffic as FTP and apply common policies;

7) Parse H.225 traffic, so as to isolate H.245 port being negotiated. Classify this traffic also as H.323 group, so that common policies can be applied. Later parse H.245 traffic and isolate PDUs containing dynamic UDP ports being negotiated. Treat them also as H.323 group traffic for the purpose of policies; and 8) In all the traffic above, perform NAT at layer 3 (e.g., for IP header), layer 4 (e.g., for TCP/UDP/ICMP headers) and layer 7 (e.g., since some protocols such as FTP (File Transfer Protocol) and H.323 transmit IP address and Port within the layer 7) for layer 3 and layer 4 information if NAT is specified.

A new protocol header may be recognized by specifying values for some predefined fields of an existing protocol header that can be recognized by the classifier. For instance, it can be determined that IP payload contains a TCP segment when the IP protocol field in the IP header is 6. So TCP is defined as a child of IP by specifying the value for the IP protocol field as 6. For each protocol that is recognized by the classifier, a subset of fields are available to further extend that protocol.

For example, the following structure can be used in the exemplary embodiment as a user-interface to sub-classify IP traffic:

```
Service Name: -----
IP Protocol:  -----
```

Using the above structure, ICMP, TCP and UDP can be defined as follows:

```
Service Name: ICMP
IP Protocol: 1
```

```
Service Name: TCP
IP Protocol: 6
```

```
Service Name: UDP
IP Protocol: 17
```

In addition, the following structure can be used as a user-interface to sub-classify TCP traffic:

```
Service Name: ---------
TCP Destination Port: --------
```

Using the above structure, FTP and H.225 can be defined as follows:

```
Service Name: FTP
TCP Destination Port: 21
```

```
Service Name: H.225
TCP Destination Port: 1720
```

Further, the following structure can be used as the user-interface to sub-classify UDP traffic:

```
Service Name: ---------
UDP Destination Port: --------
```

Using the above structure, DNS can be defined as follows:

```
Service Name: DNS
UDP Destination Port: 53
```

Still further, the following structure can be used as the user-interface to sub-classify FTP traffic:

```
Service Name: ---------
FTP Command:  [ ] Get        [ ] Put
```

Using the above structure, FTP-Get command can be defined as follows:

```
Service Name: FTP-Get
FTP Command:  [X] Get        [ ] Put
```

And, FTP-Put command can be defined as follows:

```
Service Name: FTP-Put
FTP Command:   [ ] Get           [X] Put
```

Since other classes are anticipated, they may not require a user-interface to define them at definition time, and may be anticipated (e.g., anticipated dynamically during protocol's stateful inspection) by the classification engine during actual packet flow. Further, in other embodiments, different data structures may be used in addition to or instead of the above data structures.

Table 1 illustrate an LDAP schema for the first part of the protocol classification tree 100 in an exemplary embodiment according to the present invention. This part shows children of IPV4. It should be noted that the choice of the root of the tree (Level2=802_3, Level1=Class, o=Company, c=US) and names such as Level1, Level2, etc. are arbitrary.

TABLE 1

Schema for IP Protocol Sub-Tree

| | | | | | |
|---|---|---|---|---|---|
| Level3 = IPV4 | Level2 = 802_3 | Level1 = Class | o = Company | C = US | |
| Level4 = ICMP<br>IPV4 PROTOCOL = 1<br>Tag = 3 | Level3 = 1PV4 | Level2 = 802.3 | Level1 = Class | O = Company | c = US |
| Level4 = TCP<br>IPV4PROTOCOL = G<br>Tag = 1 | Level3 = IPV4 | Level2 = 802.3 | Level1 = Class | O = Company | c = US |
| Level4 = UDP<br>IPV4PROTOCOL = 17<br>Tag = 2 | Level3 = 1PV4 | Level2 = 802.3 | Level1 = Class | O = Company | c = US |

Table 2 illustrates an LDAP schema for the second tier (part) of the protocol classification tree 100 in the exemplary embodiment. This part just shows children of TCP and UDP. They can be classified based on the destination port in the exemplary embodiment.

TABLE 2

Schema for TCP and UDP Protocol Sub-Tree

| | | | | | | |
|---|---|---|---|---|---|---|
| Level5 = FTp<br>DESTPORT = 21<br>Tag = 4 | Level4 = TCP | Level3 = IPV4 | Level2 = 802_3 | Level1 = Class | o = Company | c = US |
| Level5 = H225<br>DESPORT = 1720<br>Tag = 5 | Level4 = TCP | Level3 = IPV4 | Level2 = 802_3 | Level1 = Class | o = Company | c = US |
| Level5 = DNS<br>DESTPORT = 53<br>Tag = 6 | Level4 = UDP | Level3 = IpV4 | Level2 = 8O2_3 | Level1 = Class | o = Company | c = US |

Table 3 illustrates an LDAP schema for the third tier (part) of the protocol classification tree 100 in the exemplary embodiment. This part shows children of FTP. They can be classified based on the command in the exemplary embodiment.

TABLE 3

Schema for FTP Protocol Sub-Tree

| | | | | | | | |
|---|---|---|---|---|---|---|---|
| Level6 = FTP_Get<br>FTP_COMMAND = GET<br>Tag = 7 | Level5 = FTP | Level4 = TCP | Level3 = IPV4 | Level2 = 802_3 | Level1 = Class | o = Company | c = US |
| Level6 = FTP_Put<br>FTP_COMMAND = PUT<br>Tag = 8 | Level5 = FTP | Level4 = TCP | Level3 = IPV4 | Level2 = 802_3 | Level1 = Class | o = Company | c = US |

Table 4 illustrates a recursive process that starts at the root of the class tree in the exemplary embodiment. Each node calls its children based on the fact that all have the same parent node. Each parent node also knows which LDAP attribute it should read from the LDAP as the classification attribute. Different algorithm(s) may be used to achieve a similar result in other embodiments.

TABLE 4

Generic Algorithm for Loading Match-Tree with Attributes

LoadMatchTree (InputRoot)
Find all children under IP;
For each child, call Loadmatch function; and
Recurse As an example, the classification can start at IPV4, which can be used as the root node for illustrative purposes. At this node, the protocol knows that it classifies based on the IPV4PROTOCOL attribute. Following algorithm, for example, may illustrate the algorithm for loading the 'match-tree' for IPV4 Layer in the exemplary embodiment. Different algorithm(s) may be used to achieve a similar result in other embodiments.

LoadMatchIPV4 given matching node to be "Level3=IPV4, LEVEL2=802_3, Level1=Class, o=Company, c=US"

Find all children under Level3=IPV4, Level2=802_3, Level1=Class, o=Alcatel, c=US
(
Following are the children, per LDAP tree described above:
Level4=ICMP, Level3=IPV4, Level2=802_3, Level1=Class, o=Company, c=US
Level4=TCP, Level3=IPV4, Level2=802_3, Level1=Class, o=Company, c=US
Level4=UDP, Level3=IPV4, Level2=802_3, Level1=Class, o=company, c=US
)
For each one find the value of matching attribute(s)
(they are
IPV4PTOTOCOL=1
IPV4PROTOCOL=6
IPV4PROTOCOL=17)
respectively The following is a data-structure for match-tree node in the exemplary embodiment.

```
struct match_table{
int cti;
int ntags;
int*tags;
int children;
match_table *children;
int *childtags;
void *match_criteria;
}
```

Using the above data-structure, a tree structure may be created in memory. The above data-structure, for example, may represent a node within the protocol classification tree 100. In other embodiments, different data-structure(s) may be used.

The parameters of the above data-structure in the exemplary embodiment can be defined as follows:

1. Cti is an index into a table that contains an entry for every protocol that can be classified. This index allows children of the current node to be interpreted correctly as being of some specific type of data. For example, the IPv4 matchtree node contains an index to the IPv4 entry in a classifier table. This would inform the various portions of the system that they should expect, for example, match_criteria of this node to be loaded with IPv4loadmatch functions, compared during tagging with IPv4match functions, etc.

2. Tags is an integer array containing all the tags or ids for this protocol. It contains both individual as well as group ids.

3. Children is an array of pointers to all the child nodes of this protocol and it can point to NULL if the present node has no children. The child nodes are also pointers to structures of type match_table.

4. Childtags is an array of all the tags of all the descendants of the present node.

5. Match_criteria is a structure which is filled in by the loadmatch functions of each protocol during load time.

A top level function is called with the DN (Distinguished Name) of the LDAP entry for IP. It follows the following steps:

1. This function first populates the match_table structure for this protocol by getting all the attribute values from the LDAP node for IP.

2. Then it performs a one level search for all the child nodes of this LDAP entry.

3. If there are no child nodes, the function returns. Otherwise, it allocates an array of match_table structures, one for each child node, and fills in the attribute values from the LDAP entries into the corresponding match_table structures. It assigns the children field in the match_table structure to the start of this newly allocated match_table pointer array.

4. For each child node, the function is called recursively. For example, the following function may be used for template load match. The function and parameter names may be different in other embodiments.

int xxxloadmatch (xxxmatch **match, LDAP * ld, LDAP* ld, LDAPMessage *entry);

A purpose of this function is to build the xxxmatch structure for a given child node of protocol xxx from the attribute values contained in the LDAPMessage structure. The xxxmatch structure is the matching_criteria field in the match_table structure described above. Each protocol defines its own matching criteria, which is a subset of all possible fields in the protocol's header. With each possible field is also associated a range of values which define the sub classification of the protocol.

For example, FTP classifier has a loadmatch function defined as follows:

int FTPloadmatch (FTPmatch **match, LDAP * ld, LDAP* ld, LDAPMessage *entry);

A purpose of this function is to load a child node of FTP that has been defined in LDAP and build that part of the match-tree in the memory. FTPmatch includes a series of Booleans, one for each FTP command that is recognized by the FTP classifier. And a command argument field can also be associated with the selected commands. So a child of FTP may have one or more of these Booleans turned on.

Figure 2:
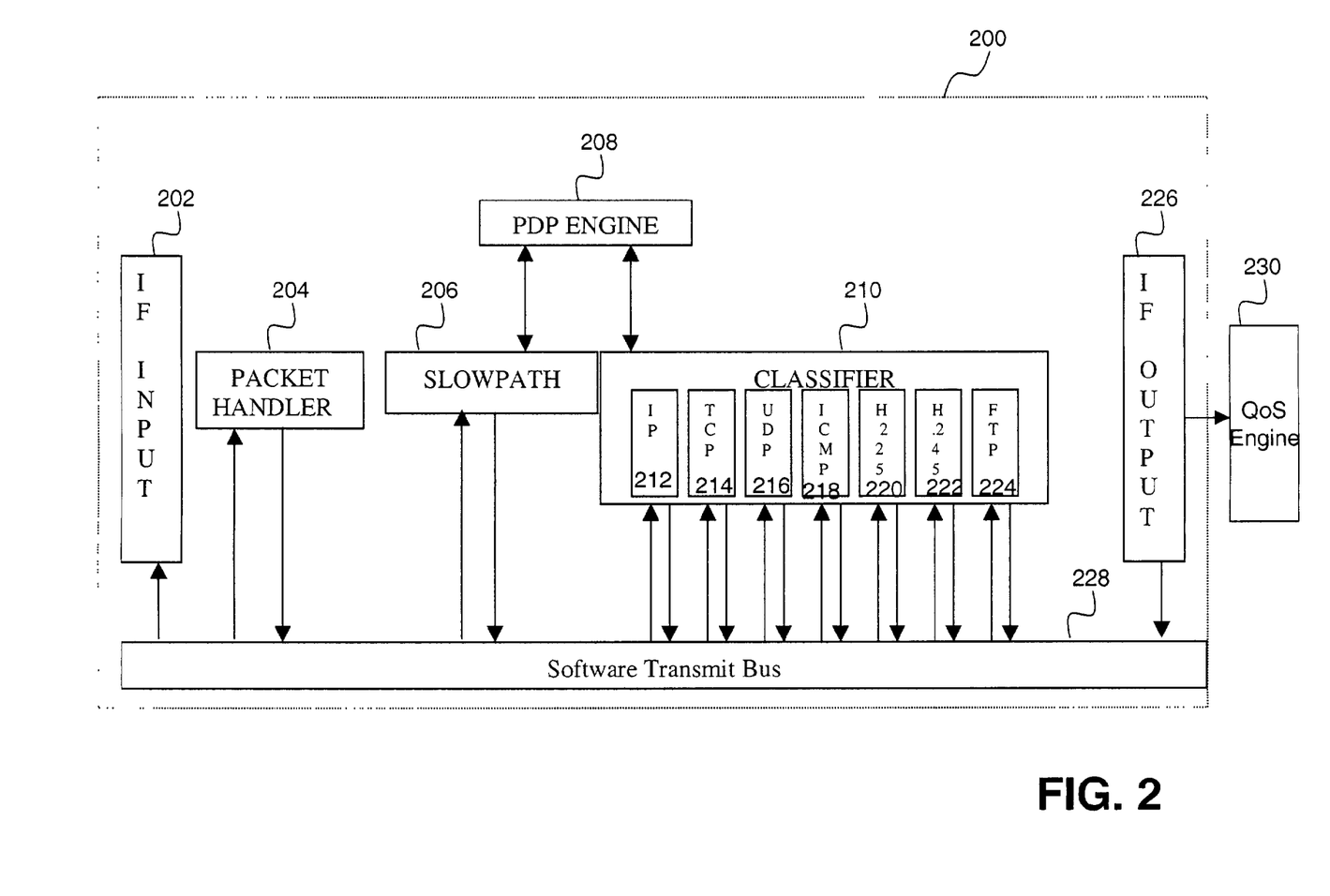
FIG. 2 illustrates an overall system diagram for protocol classification in an exemplary embodiment according to the present invention.

FIG. 2 illustrates a protocol classification engine 200 in an exemplary embodiment according to the present invention. A packet handler 204 accepts incoming PDUs (e.g., packets) from network interface via an interface input 202 and checks if a reference for this stream, in terms of 5-tuple (e.g., source address, destination address, source port, destination port and protocol), exists in a stream table. If it does not exist, the packet handler 204 creates an entry into the stream table. The packet handler 204 may parse the PDUs to check the 5-tuple. In other embodiments, a separate parser may be used to parse the PDUs.

Slowpath 206 decides the path for future PDUs in terms of NAT, QoS given the 5-tuple by making a query to a PDP (policy decision point) engine 208. It sets these values in the stream table for this entry. This modification may subsequently be used by various classifiers to perform the actual NAT operation.

A classifier 210, in addition to performing tree-based classification, performs the policy enforcement for a stream that includes access control, stateful firewall control, NAT and tagging of the stream for QOS. The classifier 210 may include one or more protocol classifier including but is not limited to, IP classifier 212, TCP classifier 214, UDP classifier 216, ICMP classifier 218, H.225 classifier 220, H.245 classifier 222 and FTP classifier 224. In other embodiments, other classifiers may be included in the classifier 210, in addition to or instead of the classifiers illustrated on FIG. 2.

A firewall administrator may set up policies for firewall, NAT and/or QOS given various protocols. The PDP Engine 208 may then return these policies in a way that can be understood by the classifiers and other system components.

Examples of policies may include, but are not limited to, one or more of the following:

1) if a packet from interface A is from IP address B, do NAT as IP address C;
2) if a packet from IP address X is protocol FTP, use QOS level 5; and
3) if a packet from IP address Y and is for FTP protocol, block it.

All components in the system may talk to each other through an abstract software transmit bus 228. Output interface process may take PDUs from the software transmit bus 228 and transmits it out to relevant physical interface over an interface output 226.

Figure 3:
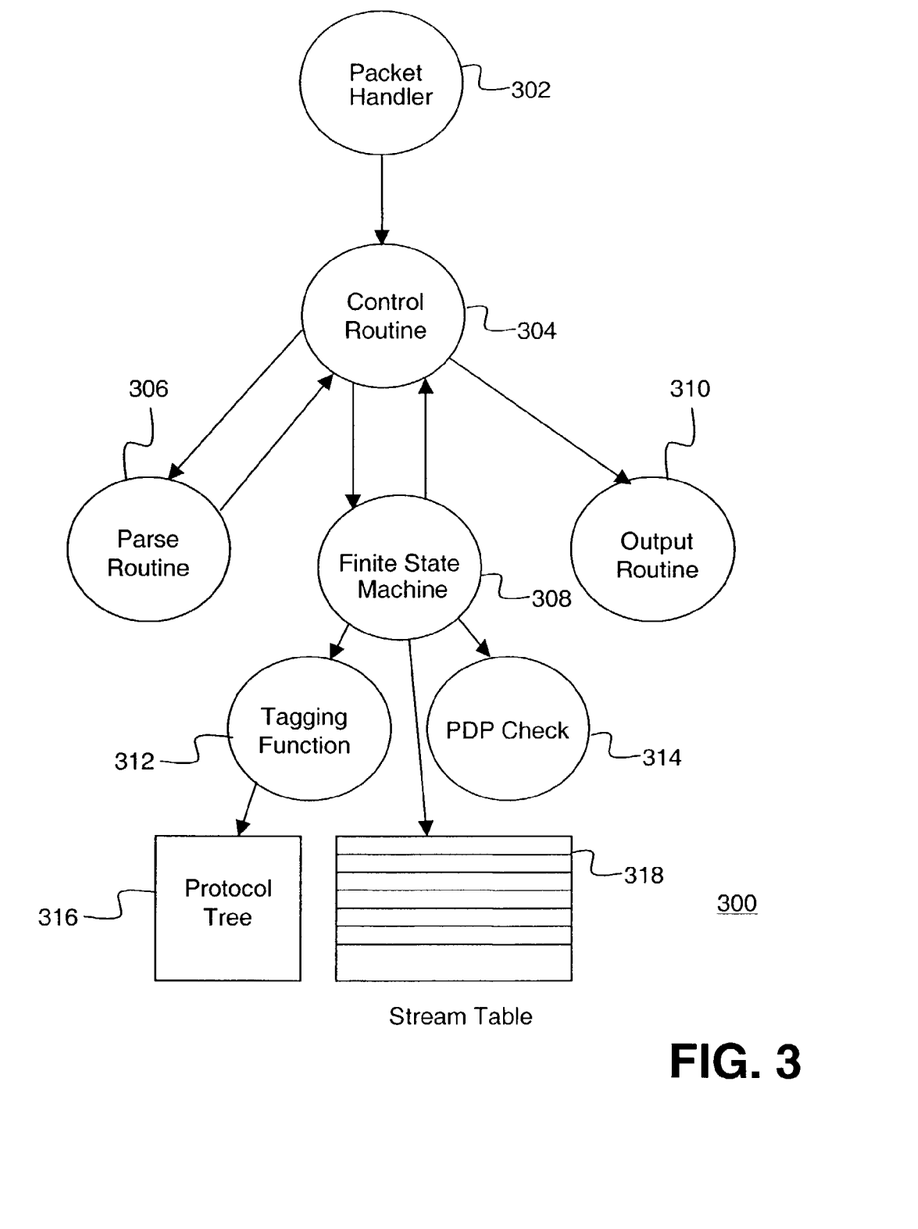
FIG. 3 illustrates a process of classifying, tagging and forwarding input PDUs.

FIG. 3 illustrates a process 300 for protocol classification in an exemplary embodiment according to the present invention. An input PDU arrives at a classification engine's controller as a message in its input queue and is handled by a packet handler 302. A control routine 304 calls a parse routine 306 and supplies raw protocol data and control information as parameters.

The parse routine 306 applies protocol syntax on the raw protocol data. If the protocol syntax check fails, an error value is returned to the control routine 304. On success, the parse routine 306 returns the abstracted protocol structure and the number of bytes consumed in the input protocol data.

The control routine 304 calls a finite state machine (FSM) 308 for this classifier and supplies the abstracted protocol structure and control information for the input PDU. The FSM 308 calls a tagging function 312, which is responsible for tagging the input PDU with the class tags that have been defined in the classifier. The tagging function 312 recursively scans the protocol tree 316 in memory to get a list of tags that have matched for the input PDU.

With this list of tags, the FSM 308 calls a PDP check routine 314 to determine if the input PDU should be allowed or denied and gets the QOS parameters for the stream. The input PDU may be provided to an external QoS engine 230 of FIG. 2 after output in 310. For example, the QoS engine 230 may use the tags to apply QoS rule to the input PDU.

The FSM may update a stream table 318 with protocol specific state variables if some information of the current PDU should be "remembered" for future use within the given connected stream. The FSM may then return the modified abstracted data structure with due modifications for application level NAT, if necessary. If the input PDU is to be blocked, the abstracted data is dropped or modified depending on the expected functionality.

The control routine 304 now calls an output routine 310 to convert the abstracted protocol structure into a data stream that can be sent out to the packet handler.

The classification engine 200 receives full application layer data from the stream interface via, for example, the IF input 202. To parse the protocol data, a protocol definition script may be defined. For example BNF (Backus Naur Form) grammar may be used to define grammar for the PDU, that can be parsed using LEX and YACC. Further LEX and YACC may be used to create a parser for parsing the PDUs based on the grammar defined by the BNF.

Each protocol may have an ASN (abstract syntax notation) definition for its data. When this ASN file is compiled, it may provide source and header files (C and H files for the cases where software is written in C) to give data structures for that protocol relevant to protocol classification. The parsed data may be written in these data structures, and these data structures may be modified by the FSM stage. Further, the output data may be regenerated from these data structures.

The parsing of protocol data, for example, may be described with the following examples. Table 5, for example, is a TCP header as described in RFC (Request for Comment) 793, which may be used to illustrate an exemplary embodiment according to the present invention.

TABLE 5

TCP Header as Described in RFC 793

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Source Port          |       Destination Port        |
+-+-+-+-+-+-+-+-+-+-+-+-+-+-+-+-+-+-+-+-+-+-+-+-+-+-+-+-+-+-+-+-+
|                        Sequence Number                        |
+-+-+-+-+-+-+-+-+-+-+-+-+-+-+-+-+-+-+-+-+-+-+-+-+-+-+-+-+-+-+-+-+
|                     Acknowledgment Number                     |
+-+-+-+-+-+-+-+-+-+-+-+-+-+-+-+-+-+-+-+-+-+-+-+-+-+-+-+-+-+-+-+-+
| Data  |           |U|A|P|R|S|F|                               |
| Offset| Reserved  |R|C|S|S|Y|I|            Window             |
|       |           |G|K|H|T|N|N|                               |
+-+-+-+-+-+-+-+-+-+-+-+-+-+-+-+-+-+-+-+-+-+-+-+-+-+-+-+-+-+-+-+-+
|           Checksum            |         Urgent Pointer        |
+-+-+-+-+-+-+-+-+-+-+-+-+-+-+-+-+-+-+-+-+-+-+-+-+-+-+-+-+-+-+-+-+
|                    Options                    |    Padding    |
+-+-+-+-+-+-+-+-+-+-+-+-+-+-+-+-+-+-+-+-+-+-+-+-+-+-+-+-+-+-+-+-+
|                            payload                            |
+-+-+-+-+-+-+-+-+-+-+-+-+-+-+-+-+-+-+-+-+-+-+-+-+-+-+-+-+-+-+-+-+
```

If a network device exposes the source and destination ports along with payload data as a pattern, from the point of controlling the firewall and QOS, the ASN.1 template for this protocol may be written as follows:

```
TCP DEFINITIONS AUTOMATIC TAGS : :=
BEGIN
TCPHeader : :=
        SEQUENCE {
                sourceport INTEGER (0..65535),
                destinationport INTEGER (0..65535),
                payload OCTET STRING (SIZE(16000))
        }
END
```

The rest of information may be irrelevant from the point of view of this network device and hence may be hidden from the administrator and the programmer who is writing the protocol classification engine.

RealAudio® protocol is an example of a protocol that uses firewall, QOS information and NAT information. When no firewall exists between a RealPlayer® and RealServer, the RealPlayer first establishes a two-way TCP connection to the RealServer. RealServer uses this connection initially as a means of sending information to the RealPlayer about the streamed media, such as the name, length, and copyright of the clip. The RealPlayer uses the connection to send commands to RealServer when features such as the "play" and "stop" buttons are activated. RealAudio® and RealPlayer® are registered trademarks of Progressive Networks, Inc., a Washington corporation, Seattle, Wash.

After the initial connection is established, RealServer establishes a UDP channel back to RealPlayer. The actual media is sent along this channel. The UDP channel is more like a custom radio channel than a telephone call in that the RealPlayer has no way of sending information back to RealServer over this UDP channel. Using the embodiments of the present invention, the above information may be abstracted into an ASN.1 syntax notation given below:

```
RealAudio DEFINITIONS AUTOMATIC TAGS
BEGIN
    RealAudioMessage : :=
        CHOICE    {
            realAudioCommand      RealAudioCommand,
            realAudioReply        RealAudioReply
        }
    RealAudioCommand : :=
        CHOICE    {
            UdpPortRequestMessage     UdpPortRequestMessage,
            OtherStartupMessage       OtherStartupMessage
        }
RealAudioReply : :=
        CHOICE    {
            ResponseMessage          ResponseMessage
        }
UdpPortRequestMessage : :=
        SEQUENCE      {
                message OCTET STRING (SIZE(6)),
                port INTEGER
                }
OtherStartupMessage: := OCTET STRING
-- After endofstartupmessages copy everything else that
-- follows
ResponseMessage : := OCTET STRING
-- this is some other response sent by the server
END
```

The above abstraction may be useful for a network device to perform one or more of the following: 1) anticipate a UDP port when the udpportrequestmessage is received; 2) to close when the control connection closes; 3) to identify UDP traffic as RealAudio traffic from the point of view firewall and QoS; and 4) if the device is doing NAT, it can appropriately replace the port number in the above representation and output a modified PDU that performs the application NAT.

As can be seen from the above two abstractions, irrelevant information may be hidden away as OCTET STRINGs and the classifier may not care about it.

In the exemplary embodiment, the FSM 308 may be used for analysis and modification of protocol data. The FSM may be used for one or more of the following to take policy decisions on a per application PDU basis:

1) Application NAT (IP address and Port);
2) Open/Close Dynamic Data Channel;
3) Cut-through of main channel;
4) Cut-through of dynamic Channels;
5) Application Level Access Control;
6) Modification/filtering of data stream; and
7) IP/TCP Level NAT.

To do one or more of the above, the FSM 308 may store protocol state in the stream table 314 across application PDUs.

The FSM 308 may read the parsed data from these data structures and may interface with the PDP engine 208 of FIG. 2 and decide action to be taken, which, for example, may be any of the above seven (7). If the PDU should be modified, the FSM 308 may modify the data structure with appropriate values. Otherwise, the FSM 308 may leave the data structure without modification.

If the PDU should be denied, it is up to the classifier 210 (and the application protocol itself) as to which of three possible outcomes will occur. For example, the classifier may perform one of: 1) modifying the PDU to return a useful message to the sender (not all protocols support this); 2) ignoring the denied data (and not passing it to the destination); and 3) actively terminating the connection.

The purpose of matching operations is to match an incoming PDU against the tree and tag it with the tags of the matched branches of the tree.

int xxxmatch (xxxMessage **pdu, xxxMatch *Matchcriteria);

The purpose of the xxxmatch routine above is to return one of four (4) possible values:

1) Full Match: This means that the PDU represented by xxxMessage completely matches all the fields specified in the match criteria.

2) Partial Match: This means that the PDU represented by xxxMessage matches only a subset of fields specified in the match criteria. The PDU has no information on the rest of the fields in the match criteria. This can happen when the protocol permits the inclusion of only a subset of all possible fields in the PDU.

3) No Match: This means that the PDU doesn't match one or more of the match criteria. This happens when there is at least one field that is present in both the PDU and the match criteria, and the value for this field is different in the two.

4) Error: Some problem occurred while comparing the current PDU to the candidate match_criteria.

The return value of the xxxmatch routine, for example, may be used by a tagit function, which is responsible for the actual tagging of a PDU.

For example, FTP classifier may have a match function defined as follows:

int FTPmatch (FTPMessage **pdu, FTPMatch *matchcriteria);

The modified data structure may then be output in the protocol's native format. Since the structure may have been modified by the analysis/modification step above, the output may now reflect changes related to NAT etc.

Various central tables are maintained by the system, and a common API is used by both layer 3 and 4 classifiers as well as layer 7 classifiers to interact with the various subsystems and shared data structures.

Stream table values may be accessed via macros. The macros in the exemplary embodiment may include one or more of, but are not limited to, the following:

GET_SRCIP and GET_SRCPORT macros may be used to get the IP address and port number in use by the initiator of the connection. GET_DSTIP and GET_DSTPORT macros may be used to get the IP address and port number of the destination the source originally tried to access. Note that due to NAT functionality, this may be different from the address and port where the connection eventually terminates. For example, there may be a one-to-one NAT rule set up to allow external users to connect to a publicly-routable address on the device, and have the connection actually established with a host on the internal network, which may have a non-routable, private IP address.

GET_TSRCIP and GET_TSRCPORT macros may return the transformed source address and port to use. In the non-NAT (direct) case, they may return the same values as their "non-NAT" equivalents. In the NAT case, they may return different values. In other words, if NAT is not performed, the value of TSRCIP will be equal to the value of SRCIP, and the value of TSRCPORT is equal to the value of SRCPORT. However, if NAT is performed, the value of TSRCIP will not be equal to the value of SRCIP, and the value of TSRCPORT will not be equal to the value of SRCPORT.

For example, if an internal host with a private IP address wants access to an external resource, the administrator would normally configure the device for one-to-many NAT, resulting in the source address of the PDU generated on the external interface changing to one of the device's local IP addresses and the source port changing to an available port on the device.

Much like the TSRC macros, GET_TDSTIP and GET_TDSTPORT macros may return the transformed destination information about the connection, and may only differ from their "non-T" equivalents in a NATted connection.

An IS_STREAM_NATTED macro returns "true" if the specified stream is involved in a NAT connection.

All of the above macros may have analogous "SET" commands, which may allow the stream table fields to be modified. Generally after changing stream table values, a COMMIT_STREAM macro may be used to ensure that appropriate subsystems are notified of the change(s).

The standard verbs used by the classifiers to perform maintenance of the various subsystems and system tables may include, but are not limited to, one or more of the following:

A CloseStream(stream) subroutine may be called when the classifier desires to shut down the given stream gracefully. After calling the subroutine, the stream may still be valid for a short while, so the subroutine can be called within the FSM step and still output the PDU it is currently handling.

An OpenPort(port, protocol) function may be called to reserve a port (within the supplied protocol family) for use in the transaction at hand. Once reserved, a given port may not be returned by subsequent calls to OpenPort until it has been explicitly release by a call to FreePort (see below). OpenPort may be used if NAT is enabled for the current connection and an additional dynamic connection is being requested by the application protocol. The "port" parameter is either a specific port desired or the special value "0", if any port may suffice.

An OpenPrivPort(port, protocol) function is a special version of the previous function which returns a port in the privileged port range (<1024), since some older protocols have restrictions on the source port used for connections.

A FreePort(port, protocol) function releases the specified port so that it may be returned by subsequent calls to OpenPort.

An Anticipate(sourceip, sourceport, destip, destport, transformsourceip, transformsourceport, transformdestip, transformdestport, protocol, msgqueue, parent) routine is called when the classifier desires to create a new stream through the device. The source/dest parameters may be used to describe the connection endpoints from the data initiator's perspective. The transform variants of the parameters may define how the endpoint should be translated for NAT.

Msgqueue variable may indicate which classifier should handle the stream, with the special queue id "0" indicating that the data should be sent directly through the device without being classified or inspected. The parent parameter may indicate the controlling stream for this new stream and is used to clone values into the new stream (such as QoS parameters). A StreamCutThrough(stream, length) function may allow the classifier to indicate that the given "stream" is no longer interesting and subsequent data in this connection no longer should be delivered to the classifier nor inspected in any way. The "length" parameter allows the classifier to indicate that the next "length" bytes should be sent directly, but after that number of bytes, data should resume normal delivery to the classifier.

A classifier_read(msgqueue, buffer, cte, tcpi_fd) function may be a standard interface for level 7 classifiers to receive data from the stream engine. The normal useage of classifier_read results in some number of bytes' being read into the supplied data buffer "buffer", and "cte" being set to indicate the stream associated with the data and the direction the data was travelling (with respect to the stream table). Note that multiple PDUs (and even a fractional PDU) may be contained in the returned buffer. The classifier is not required to handle all the data in the buffer—it will usually handle only a single PDU's worth at a time.

A classifier_write(buffer, cte) function is a companion function to classifier_read. Classifier_write may queue data waiting in "buffer" for output on the stream contained within the "ate" parameter.

A classifier_consume(cte) function may remove a specific number of bytes from a specific stream (both contained in the "cte" parameter) so that subsequent calls to classifier_read will not return them. Without calling classifier_consume, classifier_read would continue to return the same buffer of information. Classifier_consume notifies the stream engine that a certain number of bytes have been successfully handled by the classifier and may be forgotten.

A deleteStream(stream) function is a more severe version of CloseStream, resulting in the immediate release of any resources of the given stream, and the release of the stream itself. After calling deleteStream, all references to the stream become invalid, and any data arriving for that stream will result in a brand new stream's creating (and classification will begin fresh for that data with, for example, Slowpath). The deleteStream function may be called when the connection gracefully terminates, but it may also be used when something catastrophic happens during the connection which the classifier cannot correct (and the connection needs to be brought down immediately).

It will be appreciated by those of ordinary skill in the art that the invention can be embodied in other specific forms without departing from the spirit or essential character hereof. For example, those skilled in the art would appreciate that various different macros and functions described above may have different names in other embodiments, and may be defined with different parameters. The present description is therefore considered in all respects to be illustrative and not restrictive. The scope of the invention is indicated by the appended claims, and all changes that come within the meaning and range of equivalents thereof are intended to be embraced therein.

We claim:

1. A classification engine capable of receiving a plurality of protocol data units (PDUs) and performing a tree-based classification on the PDUs, the classification engine comprising:
   input means for receiving the PDUs;
   control means for supplying raw protocol data and control information as parameters of the received PDUs;
   parsing means, controlled by said control means, said parsing means capable of parsing the PDUs to generate an abstracted protocol structure for at least one of the PDUs, said parsing means further for applying a protocol syntax check on the raw protocol data of the PDU;
   a classifier that classifies the PDUs based on a protocol associated with the PDU, and said classifier sub-classifies the classified PDUs, based on sub-protocols with the protocol, to isolate traffic and to isolate commands associated with the isolated traffic;
   said classifier performs policy enforcement for the PDUs that includes at least one of: access control, stateful firewall control, and quality control;
   said control means call a finite state machine for the classifier and supply the abstracted protocol structure and control information for the received PDUs;
   said finite state machine capable to update a stream table with protocol specific state variables; said finite state machine modifies the abstracted protocol structure, based on at least one policy parameter associated with the at least one of the received PDUs;
   if a received PDU is denied, said classifier performs at least one of: modifies the PDU to return a useful message to the sender, ignoring the denied data and not passing said data to a destination and terminates the connection; and
   output means for transmitting the PDUs, tagged only with the modified abstracted protocol structure, based on the updated stream table.

2. The classification engine of claim 1, wherein the classifier comprises means for performing network address translation (NAT) on said at least one of the PDUs.

3. The classification engine of claim 1, wherein the classifier comprises means for performing firewall decision on said at least one of the PDUs.

4. The classification engine of claim 1, wherein the classifier comprises tagging means for tagging said at least one of the PDUs with at least one tag.

5. The classification engine of claim 4, wherein the tagging means tags at least one of the PDUs with at least one tag for quality of service (QoS) determination.

6. The classification engine of claim 5, wherein the output means transmit at least one of the PDUs to a QoS engine for QoS determination using said at least one tag for QoS determination.

7. The classification engine of claim 1, wherein the PDUs comprise at least one selected from a group consisting of IP packets, ATM cells and Ethernet frames.

8. The classification engine of claim 1, wherein the classifier comprises at least one protocol classifier selected from a group consisting of an IP classifier, a TCP classifier, an UDP classifier, an ICMP classifier, an H.225 classifier, an H.245 classifier and an FTP classifier, wherein the policy enforcement of the PDUs of a protocol is performed by the protocol classifier of the same protocol.

* * * * *